United States Patent [19]

Specht

[11] Patent Number: 4,570,443
[45] Date of Patent: Feb. 18, 1986

[54] METHOD FOR THE STEAM TREATMENT OF SEVERAL AUTOCLAVES AND APPARATUS FOR ITS IMPLEMENTATION

[75] Inventor: Manfred Specht, Groebenzell, Fed. Rep. of Germany

[73] Assignee: Ytong AG, Munich, Fed. Rep. of Germany

[21] Appl. No.: 515,637

[22] Filed: Jul. 20, 1983

[30] Foreign Application Priority Data

Jul. 20, 1982 [DE] Fed. Rep. of Germany ....... 3227097

[51] Int. Cl.$^4$ ................................................ F01K 3/08
[52] U.S. Cl. ........................................ 60/670; 422/242
[58] Field of Search ............... 60/648, 670, 659; 422/242

[56] References Cited

U.S. PATENT DOCUMENTS 4,240,259 12/1980 Vincent ................................. 60/670
4,240,260 12/1980 Gustafson ............................. 60/670

FOREIGN PATENT DOCUMENTS 3010337 8/1981 Fed. Rep. of Germany ...... 422/242
3041045 5/1982 Fed. Rep. of Germany ...... 422/242

Primary Examiner—Stephen F. Husar
Attorney, Agent, or Firm—Larson and Taylor

[57] ABSTRACT

The invention relates to a method for the operation of several autoclaves of an autoclave battery in which steam is carried in the circuit, whereby at least part of the steam carried in the circuit is brought to a higher pressure-temperature level from a relatively lower pressure-temperature level by means of a mechanically driven compressor, e.g., a turbocompressor, piston compressor or screw compressor without live steam supply. The invention also concerns an apparatus consisting of an autoclave battery in which steam is carried in the circuit in lines with shut-off valves, characterized by at least one compressor in the steam circulatory system.

3 Claims, 2 Drawing Figures

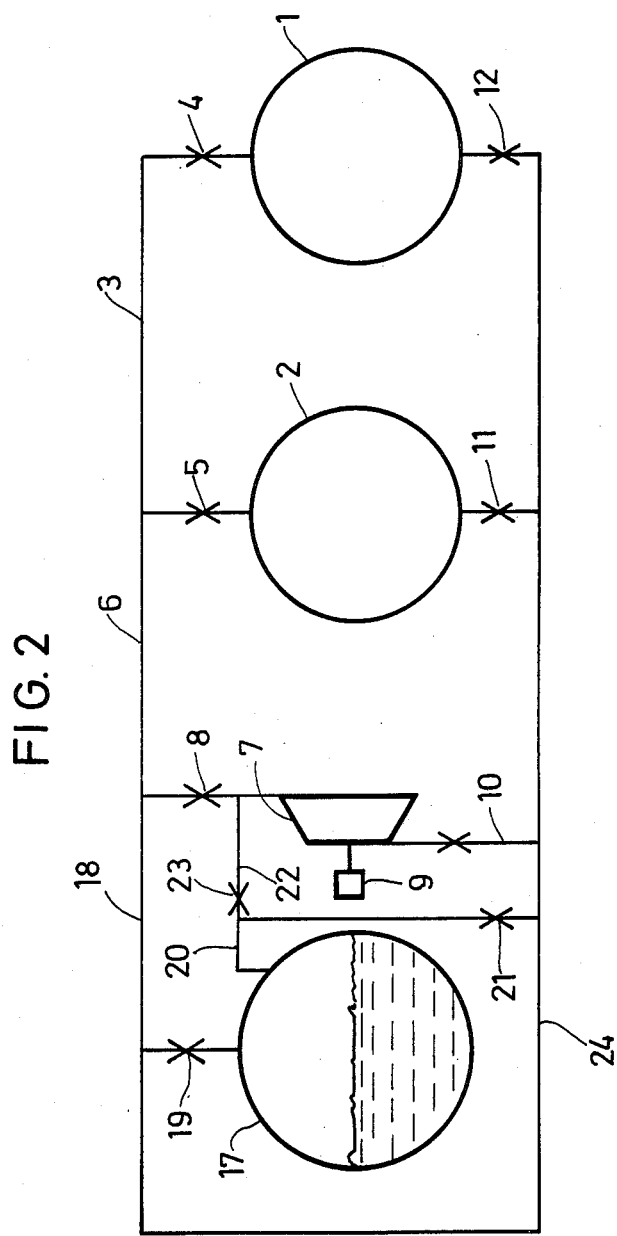

METHOD FOR THE STEAM TREATMENT OF SEVERAL AUTOCLAVES AND APPARATUS FOR ITS IMPLEMENTATION

Autoclave batteries are employed to produce hydrothermally hardened building materials such as gas concrete, foamed concrete, sand-lime bricks or the like, and after the hardening process the waste steam of one autoclave is used to fill another autoclave. This transfer is possible until there is pressure compensation, that is, until the pressure in the autoclave being filled is the same as the pressure in the autoclave being emptied. The rest of the required steam is drawn as live steam from the boiler plant.

To improve the waste steam utilization, it is common practice as disclosed in West German Pat. No. 3 010 337 to conduct the live steam as power steam through a steam injector whose intake side is connected to the autoclave to be cooled or emptied at least during a part of the heating period. The steam is first conveyed via a direct line from the autoclave to be cooled to the autoclave to be heated or filled until there is pressure compensation in both autoclaves, then the autoclave to be cooled is connected to the suction side of the steam injector. However, depending upon the counterpressure which increases in the autoclave to be heated, already at a differential pressure of approximately 2 above atmospheric pressure between the autoclave to be moved up and the autoclave to be moved down, the steam injector loses its efficiency, so that no additional waste steam can be supplied from the autoclave to be cooled. The residual steam must be eliminated from the circulation and can only either be supplied to a heat exchanger to heat the feed water of the boiler plant or discharged into the atmosphere.

It is an object of the invention to provide a method by which the steam circulation of an autoclave system can be operated without live steam, as well as an apparatus for its implementation.

This object is achieved by the features of the main claim. Other essential elements of the invention are set forth in the subclaims.

The invention will now be described with reference to an illustrative embodiment shown in the accompanying drawing, wherein:

FIG. 2 is a schematic representation of another plant for the operation of two autoclaves according to the method taught by the invention.

Figure 1:
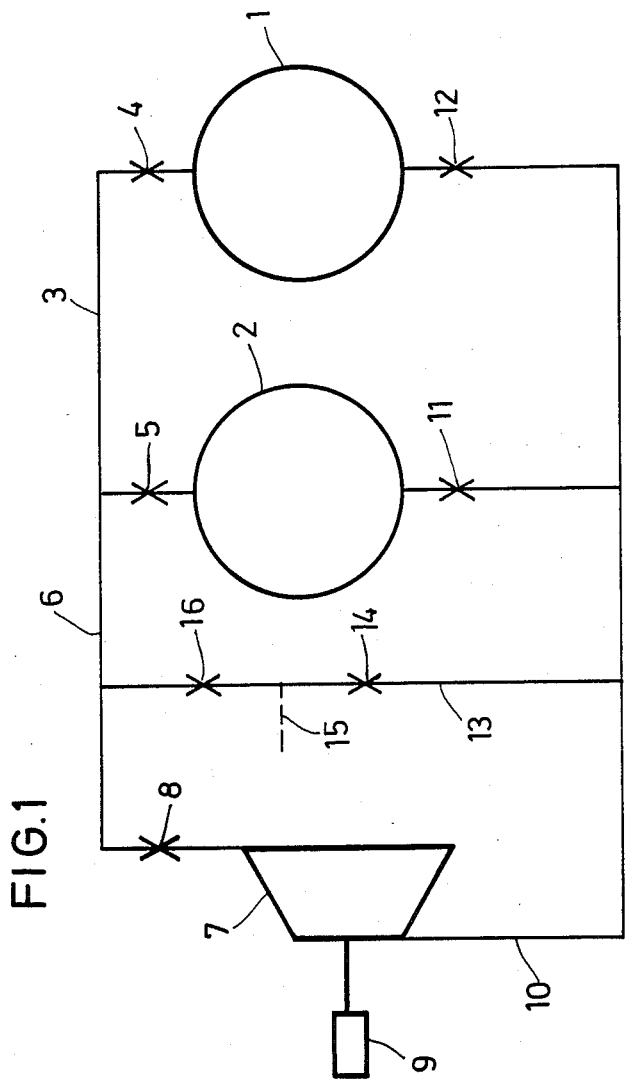
FIG. 1 is a schematic representation of a plant for the operation of two autoclaves according to the method taught by the invention.

FIG. 1 shows two autoclaves 1 and 2 connected together via an overflow line 3. Valves 4 and 5 enable the supply lines to the corresponding autoclaves 1 and 2 to be shut off. Overflow line 3 is connected to a pump-out line 6 which, according to the invention, leads to a mechanically driven high-temperature compressor 7, another shut-off valve 8 being fitted in line 6 upstream of compressor 7. High-temperature compressor 7 is a per-se known steam compressor which can be driven with suitable means, e.g., with an electromotor 9 or with a steam decompression motor or the like. A feed line 10 leads from steam compressor 7 to autoclaves 2 and 1, a shut-off valve 11 being fitted upstream of the autoclaves in the line branched off from feed line 10. A line 13 in which are secured shut-off valves 14 and 16 can connect pump-out line 6 with feed line 10, preferably between autoclave 2 and steam compressor 7. Between valves 14 and 16, line 13 is connected with the outside atmosphere and/or with a boiler plant. This is indicated by the dotted line 15.

The function of steam compressor 7 is to convert low-pressure steam with inadequate temperature into high-pressure steam with a higher temperature. Steam compressor 7 can have one or more stages and can be operated with intermediate cooling.

The hardening plant sketched in FIG. 1 can be operated as follows: Autoclave 2 is filled via line 15 with live steam from a boiler plant (not shown) which flows through lines 13 and 6 when valves 14, 8, 4, 11 and 12 are closed and valves 16 and 5 are open. The hardening period for the building material to be hardened in autoclave 2 via hydrothermal means takes place after closure of valves 16 and 5. When the hardening is over, valves 5 and 4 are opened, so that steam flows from autoclave 2 to autoclave 1 via overflow line 3 until there is pressure compensation. Valve 4 is then closed, valves 8 and 12 are opened, and steam is pumped to steam compressor 7 via line 6, the steam is compressed therein, so that it is brought to a higher temperature, and the high-pressure steam from compressor 7 fed into autoclave 1 via feed line 10. This cycle is completed when autoclave 2 is fully emptied and autoclave 1 is completely filled. Live steam need no longer be added. When autoclave 1 is completely filled, valve 12 is shut off and the hardening process is carried out.

The steam cycle can be repeated at will, that is, after the hardening process in autoclave 1, the steam in autoclave 2 is let off, with the valve in the proper position, and the residual steam is drained off to steam compressor 7, then compressed and fed into autoclave 2. If the autoclave plant is to be decommissioned, the steam can be discharged into the atmosphere via line 15 or transferred to a heat exchanger (not shown).

The use of a compressor without live steam in the steam cycle of an autoclave battery for the hardening of building materials, and which is operated with a steam regimen, was not obvious without further modification, because the compressor needs a separate drive and the latter requires energy. However, a surprising finding was that the energy for the operation of the compressor is substantially less expensive than that for the generation of additional live steam which, in the prior art methods, must be added each time the steam is transferred from one autoclave to the other after pressure compensation.

However, the use of the compressor not only affords in an advantageous manner the possibility of operating the steam cycle of an autoclave battery in whole or in part, completely without live steam, but it also permits in a very simple way the evacuation of an autoclave. This evacuation is usually carried out prior to the introduction of steam in order to vent the autoclave. This evacuation can be effected by means of the steam compressor 7 which operates in the manner of a pump. If, for example, the autoclave shown in FIG. 1 is to be evacuated, valves 5, 8 and 14 are opened and the air is sucked using steam compressor 7 via line 6 from autoclave 2 and forced into lines 10, 13 and 15, from where it is discharged into the atmosphere. This evacuation possibility greatly increases the efficiency of the compressor Another possibility which has been aspired to for a long time and which results from the use of a compressor is the fact that the old steam transfer principle, according to which, first, high-pressure steam flows into the autoclave to be filled until there is pressure compensation, then, if necessary, low-pressure steam is forced thereinto in combination with live steam, succeeds by the combination of the compressor with at least one steam accumulator known in the prior art. Advantageous is the combination with a high-pressure and a low-pressure accumulator in order to minimize the pressure differential to be overcome and, thereby, to achieve an as high an efficiency ratio as possible for the compressor.

FIG. 2 shows a schematic diagram of such a plant with an accumulator 17 which, for example, can be a high-pressure accumulator. Compared to the plant shown in FIG. 1, the plant in FIG. 2 has a supply line 18 leading to the accumulator 17 and having a valve 19, as well as a line 20 leading away from the accumulator 17 and having a valve 21, with line 20 running into line 10. A line 22 with valve 23 to line 6 is branched off from discharge pipe 20.

The operation of this hardening installation is as follows: High-pressure stream is conducted to accumulator 17 via lines 3, 6 and 18 from the autoclave 1 to be drained and at an appropriate valve position until pressure compensation or equilibrium is achieved. Then, lower-pressure steam is introduced into the evacuated autoclave 2 via line 3, likewise until there is pressure compensation or balance. Subsequently, autoclave 1 is pumped empty by means of compressor 7 via lines 3 and 6, the steam is compressed and pumped into autoclave 2 via line 10. Thereafter, high-pressure steam can be drawn from accumulator 17 via lines 20 and 10 up to pressure compensation. The rest of the required steam is finally drawn off from accumulator 17 via lines 20, 22, compressed in compressor 7, and forced into autoclave 2 via line 10. If one considers that the volumes of steam are inversely proportional to the pressure, one can appreciate the significant advantage resulting from the fact that low-pressure steam can be conducted directly from the autoclave to be emptied to the autoclave to be heated.

Steam can also be pumped using compressor 7 from an autoclave 1 or 2 via lines 3, 6, 10 and 24 into accumulator 17 when the pressure level in the accumulator is higher than in the autoclave concerned. A more effective result is achieved by cascading two or more accumulators 17, the second accumulator being operated as a low-pressure accumulator which, for example, after the first pressure compensation in the first accumulator receives the lower-pressure steam from the autoclave to be emptied until pressure compensation is accomplished and, by analogy, in reverse order supplies steam to the autoclave to be filled.

With the devices described hereinabove, the steam cycle of an autoclave battery consisting of several autoclaves can be carried out to maximum advantage without the addition of live steam. The addition of live steam is only necessary, for example, in the case of steam losses or after draining off the whole plant. Needless to say that the optimum regimen can differ from that described herein by way of illustration only. It is well within the capability of the average artisan to set up the most favorable regimen in each particular case.

What is claimed is:

1. A method for operating a plurality of autoclaves of a bank of such autoclaves, especially for hardening aerated cement, in which steam is fed into the circuit, said method being characterized in that the steam is conducted out of a autoclave which is to be cooled and into an autoclave which is to be heated up until a pressure balance is reached, and then residual steam is suctioned off from the autoclave which is to be cooled using a steam compressor, is compressed and is forced into the autoclave which is to be heated up.

2. A method as claimed in claim 1, characterized in that steam is first conducted out of the autoclave which is to be cooled and into a steam accumulator until a pressure balance is reached, then steam is conducted from the autoclave which is to be cooled and supplied to the autoclave which is to be heated up until a pressure balance is reached, and then residual steam is suctioned out of the autoclave which is to be cooled by means of the steam compressor, is compressed and is forced into the autoclave which is to be heated up, steam is drained off through a pipe connection from the steam accumulator into the autoclave which is to be heated up and then residual steam is suctioned off from the accumulator with the compressor, is compressed and is forced into the autoclave which is to be heated up.

3. A method as claimed in claim 2 characterized in that when a pressure balance is reached between accumulator and autoclave which is to be cooled down, residual steam is suctioned off from the autoclave which is to be cooled down using the steam compressor, is compressed and is forced into the accumulator.

* * * * *